(12) United States Patent
Schwenkert

(10) Patent No.: US 7,793,548 B2
(45) Date of Patent: Sep. 14, 2010

(54) PRESSURE DETERMINATION DEVICE AND METHOD FOR OPERATING A PRESSURE DETERMINATION DEVICE

(75) Inventor: Michael Schwenkert, Ingolstadt (DE)

(73) Assignee: Audi AG, Ingolstadt (DE)

( * ) Notice: Subject to any disclaimer, the term of this patent is extended or adjusted under 35 U.S.C. 154(b) by 105 days.

(21) Appl. No.: 12/352,204

(22) Filed: Jan. 12, 2009

(65) Prior Publication Data

US 2009/0151462 A1 Jun. 18, 2009

(30) Foreign Application Priority Data

Jan. 16, 2008 (DE) .................. 10 2008 004 626

(51) Int. Cl.
*G01L 11/00* (2006.01)
(52) U.S. Cl. ...................................... 73/702
(58) Field of Classification Search .................. None
See application file for complete search history.

(56) References Cited

U.S. PATENT DOCUMENTS

| 4,973,854 A | * | 11/1990 | Hummel | 267/64.26 |
|---|---|---|---|---|
| 5,450,982 A | * | 9/1995 | Van Den Oever | 221/93 |
| 5,635,630 A | | 6/1997 | Dawson et al. | |
| 6,099,653 A | * | 8/2000 | Bhandari et al. | 118/726 |
| 2009/0035121 A1 | * | 2/2009 | Watson et al. | 415/1 |

FOREIGN PATENT DOCUMENTS

EP 1 234 110 B1 3/2006

* cited by examiner

*Primary Examiner*—Andre J Allen
(74) *Attorney, Agent, or Firm*—Novak Druce + Quigg LLP

(57) ABSTRACT

The invention relates to a pressure determination device for determining the pressure in a fuel storage arrangement, with a connection element for connecting the pressure determination device to the fuel storage arrangement, a first chamber, a connecting line for communicating connection of the interior of the connection element to the first chamber, a second chamber, a membrane, and a switch, the interior of the connection element, the connecting line and the first chamber being made to accommodate throughflow of a fluid, the first chamber being made separated fluid-tight from the second chamber at least by means of the membrane, and the membrane being made for actuating the switch at least depending on the pressure of the fluid in the first chamber, and the connecting line being provided with a vibration damping element through which a fluid can flow.

20 Claims, 1 Drawing Sheet

PRESSURE DETERMINATION DEVICE AND METHOD FOR OPERATING A PRESSURE DETERMINATION DEVICE

The invention relates to a pressure determination device for determining the pressure in a fuel storage arrangement, with a connection element for connecting the pressure determination device to the fuel storage arrangement, with a first chamber, a connecting line for communicating connection of the interior of the connection element to the first chamber, a second chamber, a membrane, and a switch. The interior of the connection element, the connecting line, and the first chamber are made to accommodate the throughflow of a fluid. The first chamber is made separated fluid-tight from the second chamber at least by means of the membrane. Furthermore, the membrane is configured for actuation of the switch at least depending on the pressure of the fluid in the first chamber.

BACKGROUND OF THE INVENTION

EP 1 234 110 B1 describes a pressure determination device by means of which the pressure in the fuel storage arrangement can be determined and a potential leak in the fuel storage arrangement can be detected. The pressure determination device, in this case, is connected by means of a connection element to the activated charcoal canister of the fuel storage arrangement. The activated charcoal canister is connected to a fuel tank of the fuel storage arrangement by means of a line through which gaseous fuel can flow. The activated charcoal filter is designed for storage of gaseous hydrocarbons. To regenerate the activated charcoal canister, a shutoff valve is opened in a supply line to the activated charcoal canister and at the same time a regeneration valve is opened in a discharge line which leads away from the activated charcoal canister. A negative pressure in the discharge line provides for discharge of the stored hydrocarbons from the activated charcoal canister.

To determine the pressure in the fuel storage arrangement for purposes of finding a leak in the fuel storage arrangement, the connection element is connected to the activated charcoal canister and the fuel storage arrangement is blocked fluid-tight. With declining temperature in the fuel storage arrangement, a negative pressure is established in the interior of the connection element. The negative pressure is transferred to the first chamber by way of a connecting line for communicating connection of the interior to the first chamber of the pressure determination device.

The pressure determination device has a second chamber in which atmospheric pressure prevails. The second chamber which is connected to the atmospheric air pressure of the exterior by way of another connection element is made separated fluid-tight from the first chamber and from the interior of the connection element. A membrane which separates the first chamber from the second chamber fluid-tight moves under the influence of the negative pressure in the first chamber, the membrane arching in the direction to the first chamber. Moving the membrane actuates a switch and a switching signal is produced. A time interval from connection of the connection element to the fluid-tight, blocked activated charcoal canister, until actuation of the switch and the initial temperature of the fuel storage arrangement are determined. Depending on the time interval and the initial temperature, it can be ascertained whether the negative pressure, which is being established in the fuel storage arrangement as a result of the decrease of the temperature, allows sufficient tightness of the fuel storage arrangement to be deduced.

In the operation of pressure determination devices of the type described, for example, in EP 1 234 110 B1, relatively rapid mechanical wear of the switch was observed.

The object of this invention is therefore to devise a pressure determination device and a method for operating a pressure determination device of the initially mentioned type in which there is especially good protection of the switch against damage.

SUMMARY OF THE INVENTION

In the generic pressure determination device it is provided according to the invention that the connecting line is assigned a vibration damping element through which a fluid can flow. The invention is based on the finding that wear of the switch is promoted especially by transfer of vibration of the fluid located in the connecting line to the membrane. Thus the membrane can be excited to resonant vibration by vibration of the fluid. The vibration of the fluid is caused by timed opening and closing of the shutoff valve assigned to the activated charcoal canister of the fuel storage arrangement. The shutoff valve of the activated charcoal canister is cyclically opened in order to protect against overheating. In this case, the clock frequency is 10 Hz. But the fluid can be excited to resonant vibration by vibrations in the frequency range from 10 Hz to 60 Hz if there is no vibration damping element.

If the membrane is also excited to resonant vibration, relatively frequent actuation of the switch can occur by means of the membrane or by means of an actuating element integrated into the membrane; this ultimately leads to relatively rapid mechanical damage to the switch.

The vibration damping element assigned to the connecting line makes it possible to prevent resonant vibration of the membrane, however, transfer of a slow pressure change between the first chamber and the interior of the connection element and the associated defined movement of the membrane for actuating the switch being enabled.

Thus the switch is actuated essentially when this is desired for determining the pressure in the fuel storage arrangement, that is, when the pressure determination device is operating in measurement mode for determining a leak of the fuel storage arrangement. Conversely, the switch is especially well protected against damage when the pressure determination device is operated in the readiness state in which the shutoff valve of the activated charcoal canister is cyclically opened.

In one advantageous configuration of the invention, the vibration damping element comprises a throttle element which, in particular, has a constriction region in the connecting line. In this way a vibration damping element through which the fluid can flow and which can be easily implemented is made available.

But especially when the pressure determination device is operating at temperatures below 0° Celsius has it been shown to be advantageous if the vibration damping element, as an alternative to the throttle element, encompasses a sintered body. This is based on the finding that water can condense as a result of the differences in temperature and pressure of the fluid in the fuel storage arrangement and in the pressure determination device. In particular, in the constriction regions of the pressure determination device freezing water can impede flow of the fluid through the pressure determination device, particularly by mechanical blockage of the connecting line. This is counteracted by the sintered body since it makes available a relatively large surface to the condensed water, as a result of which evaporation of the condensed water is facilitated.

Furthermore, it has been found to be advantageous if the sintered body is arranged countersunk into the connecting line at least in certain sections. In this way especially efficient attenuation of the vibrating mass system which encompasses the fluid located in the connecting line and the membrane is enabled. In this respect, at the same time a surface of the sintered body to be wetted within the interior is made available, for example, to the water which forms in the interior of the connection element as a result of condensation of water vapor.

Furthermore, it is advantageous if the connecting line has a first end region which faces the first chamber and a second end region which faces the connection element, the sintered body being arranged to fill in cross section a middle region located between the end regions of the connecting line. As a result, the sintered body is active in the middle region of the connecting line in which efficient attenuation of the vibrating mass system can be achieved especially well.

In one advantageous embodiment of the invention, the volume occupied by the sintered body in the connecting line is smaller than the volume of the connecting line, in particular by 98 percent to 80 percent, preferably by 90 percent. Thus, especially effective protection against penetration of water and thus protection against freezing in the connecting line are made available by the sintered body, at the same time a continually good flow capacity through the connecting line and efficient attenuation of the vibrating mass system being ensured.

It is furthermore advantageous if the sintered body has a pore spacing from 20 μm to 40 μm, preferably 30 μm. This pore spacing is especially effective in the attenuation of the mass system which comprises the membrane and the fluid located in the connecting line. The sintered body in this connection acts as a lowpass filter for a slow flow of the fluid in the connecting line which occurs as a result of slow pressure changes, and an associated movement of the membrane. The microstructure of the sintered body which accompanies the pore spacing of 30 μm has proven especially effective when the surface tension of the water droplet decreases, as a result of which especially rapid evaporation of the condensed water can be achieved. Furthermore, sintered bodies with this microstructure can be produced especially easily and economically.

In one advantageous configuration of the invention, the sintered body has an at least essentially cylindrical jacket surface, at least one axial end region of the sintered body being made convexly arched. Thus, an especially large surface is made available to the condensing water by the sintered body and condensed water can run off especially well on the convex arches of the sintered body which are on the side of the end region.

Finally, it has been shown to be advantageous if the sintered body consists of a sintered metal. This yields a sintered body which can be produced especially economically. Furthermore, the desired surfaces, mesh thicknesses, grain sizes, and porosities of the sintered body can be adjusted especially easily and accurately. Of course, in alternative embodiments of the sintered body, said body can comprise a ceramic material or can consist entirely of ceramic material.

The advantages and preferred embodiments described in conjunction with the pressure determination device according to the invention also apply to the method according to the invention for operating a pressure determination device.

Other advantages, features, and details of the invention will become apparent from the following description of one preferred embodiment and using the drawings in which the same or functionally identical elements are provided with identical reference numbers.

BRIEF DESCRIPTION OF THE DRAWINGS

FIG. 1 shows a pressure determination device 10 in a sectional view. By means of the pressure determination device 10 the pressure in a fuel storage arrangement, for example, of a motor vehicle, can be determined. By means of determining the pressure in the fuel storage arrangement which is not shown here, it can be ascertained, depending on the temperature of the fuel storage arrangement, whether the fuel storage arrangement has a leak.

Figure 1:
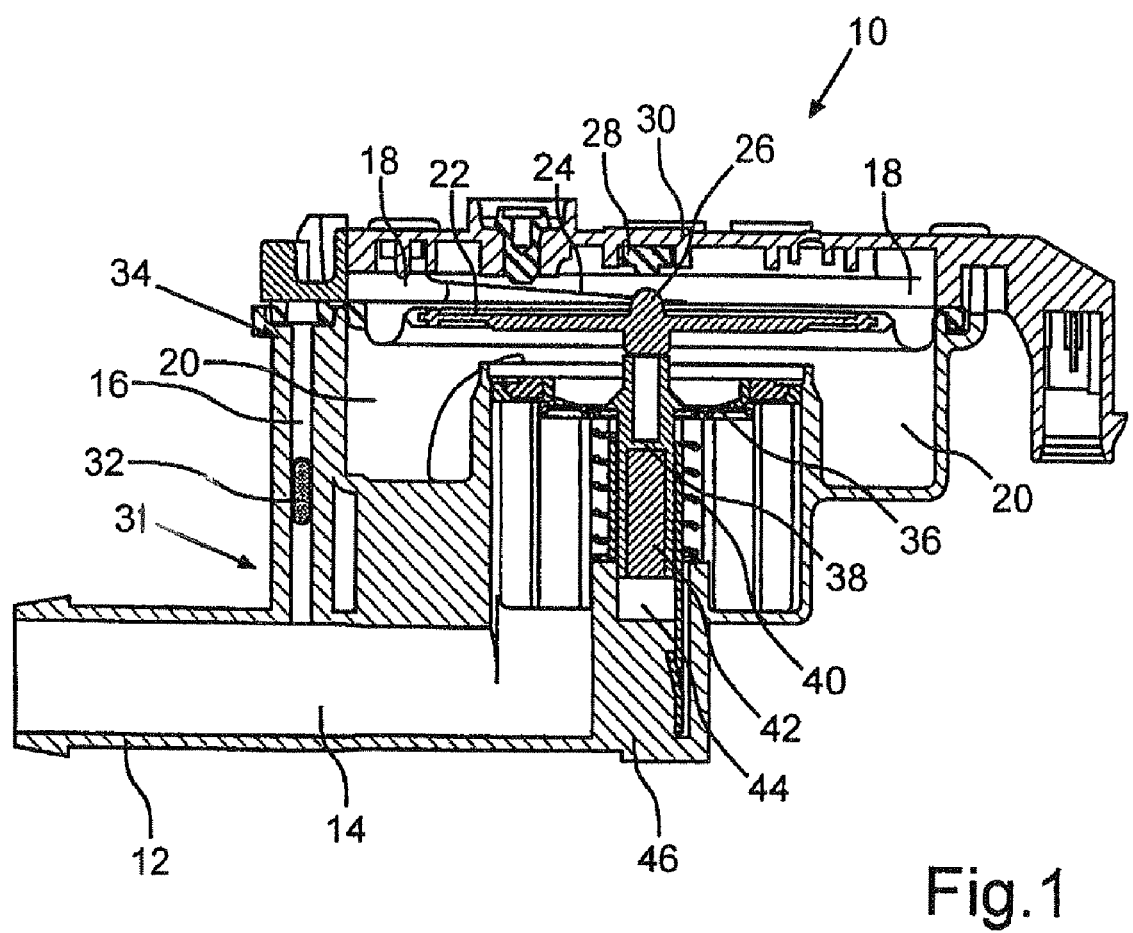
FIG. 1 shows a cross section through a pressure determination device for determining the pressure in a fuel storage arrangement.

To connect the pressure determination device 10 to the fuel storage arrangement, there is a connection element 12 which is shown in FIG. 1 and which has a quarter-turn fastener here. The interior 14 of the connection element 12 is connected by means of a connecting line 16 through which a fluid can flow to the first chamber 18 of the pressure determination device 10. If the connection element 12 is connected to the activated charcoal canister which is assigned to the fuel storage arrangement, and if a fuel tank, which is not shown here and which is likewise assigned to the fuel storage arrangement, for example, as a result of the operation of the motor vehicle, has a temperature which exceeds the ambient temperature, with cooling of the fuel storage arrangement, a negative pressure is established in the interior 14 of the pressure determination device. For this reason, it is necessary to block the fuel storage arrangement fluid-tight with connection of the connection element 12 to the activated charcoal canister of the fuel storage arrangement.

The negative pressure in the interior 14 is referenced here to the atmospheric pressure which prevails in the second chamber 20 of the pressure determination device 10. The second chamber 20 is made separated fluid-tight from the first chamber 18 and from the interior 14 of the connection element 12. For this purpose, there is a membrane 22 between the first chamber 18 and the second chamber 20. The membrane 22 is exposed to a spring force by means of a spring element 24 which is made as a leaf spring here. In the movement of the membrane 22 against the spring element 24 which is caused by the negative pressure in the first chamber 18, the spring force of the spring element 24 must be overcome. If the membrane 22 is moved far enough, an actuating element 26 which is integrated into the membrane 22 makes contact with a switch 28 which here is integrated into a circuit board 30. The circuit board 30 terminates the first chamber 18 toward the top of the pressure determination device 10.

In operating the pressure determination device 10 in a measurement mode in which the pressure is determined in the fuel storage arrangement which is connected by means of the connection element 12, the time which elapses from fluid-tight closing of the fuel storage arrangement to actuation of the switch 28 is measured. At the same time the temperature in the fuel storage arrangement is measured as a function of time. By means of these data it can be ascertained whether there is a leak in the fuel storage arrangement. For this purpose, there is a corresponding electronic evaluation unit which is not shown here and to which the switching signal of the switch 28 is transmitted.

If the pressure determination device 10 is operating in a readiness state in which the fuel storage arrangement is not closed continuously fluid-tight, as a result of cyclic opening and closing of a shutoff valve for blocking the supply line of the activated charcoal canister, vibrations can be transmitted to the fluid located in the connecting line 16. These vibrations must be prevented from leading to resonant vibration of the membrane 22 and to associated mechanical damage of the switch 28. In order to prevent resonant vibration of the membrane 22, there is a vibration damping element in the middle region of the connecting line 16 which is spaced apart from the end region 31 of the connecting line 16 facing the connection element 12. The vibration damping element is made here as a sintered body 32 through which fluid can flow. The middle region of the connecting line 16 is likewise spaced apart from the other end region 34 which faces the first chamber 18.

By preventing the resonant vibration of the membrane 22 there is especially effective protection of the switch 28 against mechanical damage as a result of very frequent contact between the actuating element 26 which is assigned to the membrane 22, and the switch 28. This contributes to extending the service life of the pressure determination device 10.

The sintered body 32 here consists of a sintered metal. The sintered body 32 has a microstructure which is especially suited to destroying the surface tension of a water droplet. In this instance, the sintered body 32 is characterized by a pore spacing of 30 μm. The sintered body 32 in the connecting line 16 occupies a volume which is 90 percent smaller than the volume of the connecting line 16.

The surfaces and mesh thicknesses of the sintered body 32 which have been defined in this way on the one hand enable especially efficient attenuation of the mass system which encompasses the fluid in the connecting line 16 and the membrane 22, whereby resonant vibration of the membrane 22 as a result of cyclic opening of the shutoff valve is prevented.

Furthermore, the microstructure of the sintered body 32 described here is especially well suited to making available to the condensing water which can form as a result of temperature and pressure differences between the fuel storage arrangement and the pressure determination device 10, such a large surface that the condensed water can evaporate especially quickly from the sintered body 32. The sintered body 32 thus acts as protection against water penetration and therefore freezing, especially for the connecting line 16.

In the form of the sintered body 32 an especially economical vibration damping element is thus made available which, moreover, reliably stops freezing of the connecting line 16.

It is preferred here that the sintered body 32 be arranged in the middle region of the connecting line 16. In order to make available a suitable surface without edges to the condensed water in the interior 14 of the connection element 12 and in the connecting line 16, the axial end regions of the sintered body 32, which has a cylindrical jacket surface, here can be made convexly arched.

In alternative embodiments it can be provided that the sintered body 32 be arranged countersunk only in certain sections in the connecting line 16, while the end region of the sintered body 32 projects into the interior 14. The end region here can also have a cross section which is different from the cross section of the connecting line 16, especially is larger.

FIG. 1 furthermore shows that the second chamber 20 is separated fluid-tight from the interior 14 of the connection element 12 by means of a valve 36. The valve 36 is assigned another actuating element 38 by means of which the valve 36 can be moved into the open position from the closed position shown in FIG. 2. In the open position the exchange of fluid between the interior 14 and the second chamber 20 is enabled.

The actuating element 38 in this respect is to be moved away from the actuating element 26 which is assigned to the membrane 22 against the force of a spring 40. An armature 42 assigned to the actuating element 38 is moved into a cavity 44 of the housing 46 of the pressure determination device 10. The movement of the armature 42 and the associated opening of the valve 36 can be effected by an especially high negative pressure in the interior 14, for which the actuating element 26 is already in contact with the switch 28. Likewise, the movement of the armature 42 can be triggered intentionally in order to enable controlled fluid exchange between the interior 14 and the second chamber 20.

Figure 2:
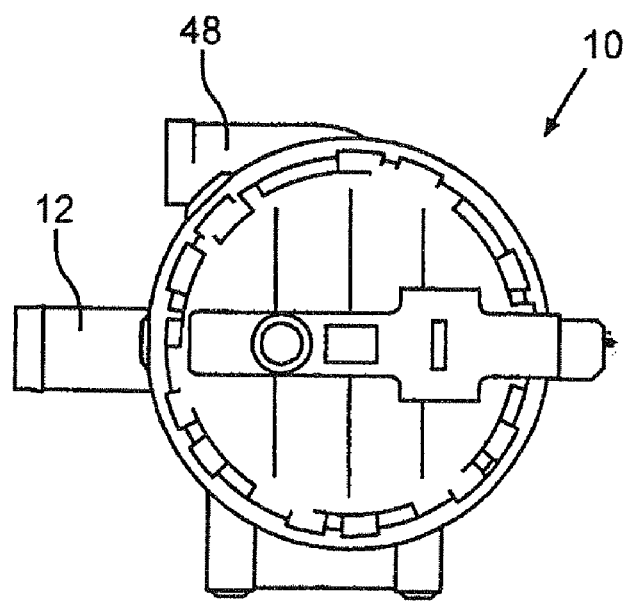
FIG. 2 shows an overhead view of the top of the pressure determination device as shown in FIG. 1.

FIG. 2 shows the pressure determination device 10 as shown in FIG. 1 in a top view. It can be recognized here that the second chamber 20 is assigned another connection element 48 by means of which the second chamber 20 is connected to the exterior of the pressure determination device 10 in which atmospheric pressure prevails.

The invention claimed is:

1. A pressure determination device for determining the pressure in a fuel storage arrangement, with
    a connection element for connecting the pressure determination device (10) to the fuel storage arrangement,
    a first chamber,
    a connecting line for communicating connection of the interior (14) of the connection element to the first chamber,
    a second chamber,
    a membrane,
    and a switch,
    wherein the interior of the connection element, the connecting line and the first chamber are made to accommodate throughflow of a fluid, the first chamber is made separated fluid-tight from the second chamber at least by means of the membrane, and the membrane is functional for actuating the switch at least depending on the pressure of the fluid in the first chamber, the connecting line is provided with a vibration damping element through which a fluid can flow.

2. The pressure determination device according to claim 1, wherein the vibration damping element comprises a throttle element which has, in particular, a constriction region in the connecting line.

3. The pressure determination device according to claim 1 wherein the vibration damping element comprises a sintered body.

4. The pressure determination device according to claim 3 wherein the sintered body is arranged countersunk into the connecting line at least in certain sections.

5. The pressure determination device according to claim 3 wherein the connecting line has a first end region which faces the first chamber and a second end region which faces the connection element, the sintered body being arranged to fill in cross section a middle region located between the end regions of the connecting line.

6. The pressure determination device according to claim 3 wherein the volume occupied by the sintered body in the connecting line is smaller than the volume of the connecting line, in particular by 98 percent to 80 percent, preferably by 90 percent.

7. The pressure determination device according to claim 3 wherein the sintered body has a pore spacing from 20 μm to 40 μm, preferably 30 μm.

8. The pressure determination device according to claim 3 wherein the sintered body has an at least essentially cylindrical jacket surface, at least one axial end region of the sintered body being made convexly arched.

9. The pressure determination device according to claim 3 wherein the sintered body consists of a sintered metal.

10. A method for operating a pressure determination device for determining the pressure in a fuel storage arrangement, the pressure determination device, with the following
   a connection element for connecting the pressure determination device to the fuel storage arrangement,
   a first chamber,
   a connecting line for communicating connection of the interior of the connection element to the first chamber,
   a second chamber,
   a membrane,
   and a switch,
   wherein the first chamber is made separated fluid-tight from the second chamber at least by means of the membrane, and the membrane is made for actuating the switch at least depending on the pressure of the fluid in the first chamber, in which fluid flows through the interior of the connection element, the connecting line and the first chamber and the fluid in the connecting line is damped by means of a vibration damping element through which the fluid flows.

11. A device for sensing the pressure of a gas in a gas storage tank, comprising:
   a housing provided with a compartment, including a diaphragm disposed in said compartment providing first and second chambers, a first passageway communicating with said first chamber and communicable with said gas storage tank, a second passageway intercommunicating said second chamber and the atmosphere, a fixed contact element disposed in said first chamber in opposed relation to said diaphragm and a displaceable contact element disposed on said diaphragm engageable with said fixed contact upon flexure of said diaphragm effected by a pressure differential between said chambers; and
   a body formed of a vibration dampening material disposed in said first passageway.

12. A device according to claim 11 wherein said body is disposed partially in the path of gases flowing through said first passageway.

13. A device according to claim 11 wherein said body is disposed entirely in the path of gases flowing through said first passageway.

14. A device according to claim 11 wherein said body is formed of a metallic material.

15. A device according to claim 11 wherein said body is formed of a ceramic material.

16. A device according to claim 11 wherein said body is formed of a sintered metal.

17. A device according to claim 16 wherein said body is provided with a pore size in the range of 20 μm and 40 μm.

18. A device according to claim 11 wherein the length of said body is less than the length of said first passageway.

19. A device according to claim 11 wherein at least one end of said body is provided with a convex configuration.

20. A method of sensing a variation in pressure of a gas in a storage member, comprising:
   dampening the vibrations of a flow of said gas;
   supplying said flow of vibration dampened gas into a first chamber of a compartment separated into two chambers by a flexible diaphragm;
   providing a second gas of a known pressure in the other of said chambers; and
   detecting the pressure differential across said diaphragm as a function of the flexing thereof.

* * * * *